(No Model.)
T. JOHNSON.
SULKY ATTACHMENT FOR PLOWS.
No. 331,972. Patented Dec. 8, 1885.
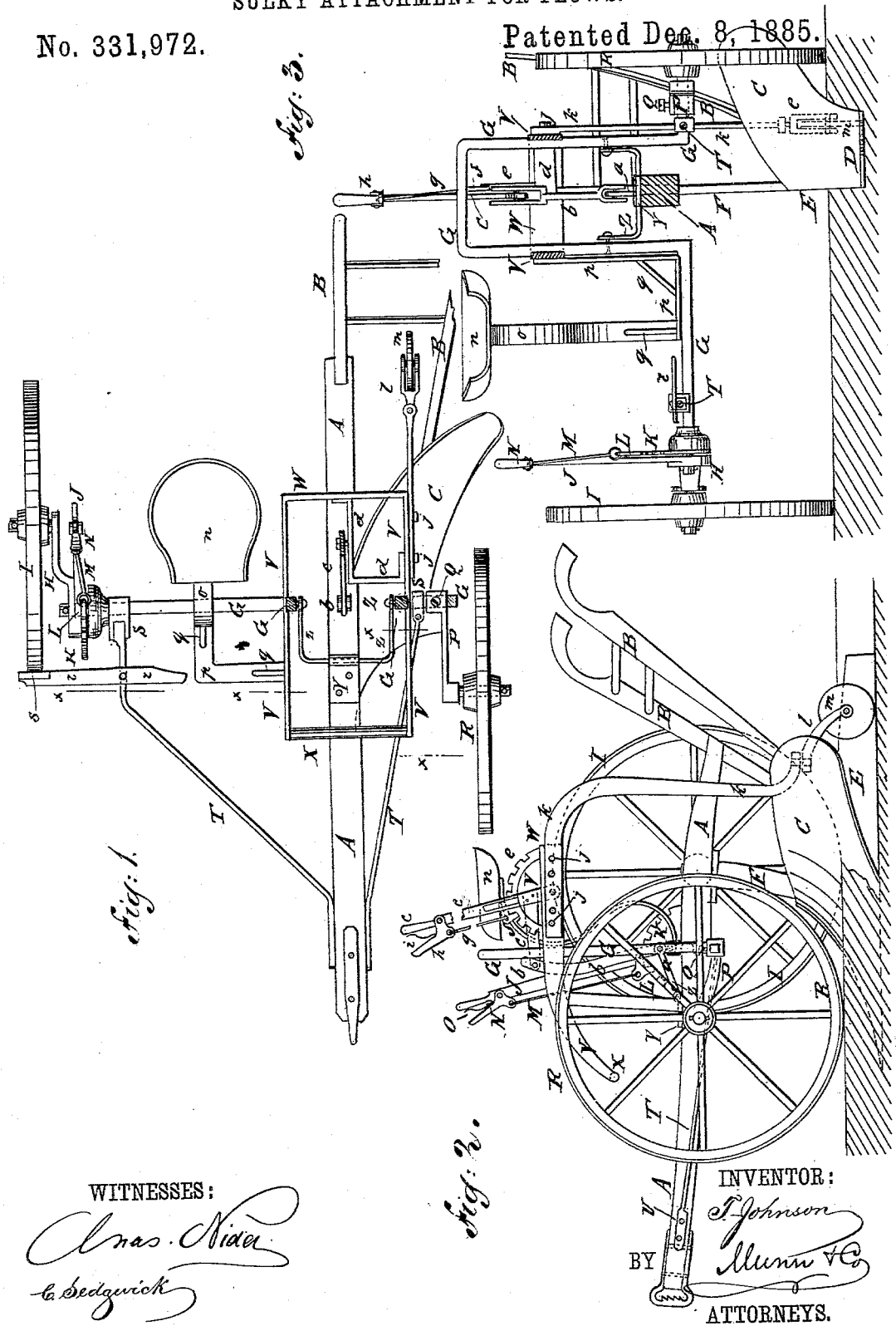
WITNESSES:
INVENTOR:
T. Johnson
BY Munn & Co.
ATTORNEYS.
N. PETERS, Photo-Lithographer, Washington, D. C.

United States Patent Office.

THEODORE JOHNSON, OF PETERSBURG, INDIANA.

SULKY ATTACHMENT FOR PLOWS.

SPECIFICATION forming part of Letters Patent No. 331,972, dated December 8, 1885.

Application filed July 2, 1885. Serial No. 170,487. (No model.)

*To all whom it may concern:*

Be it known that I, THEODORE JOHNSON, of Petersburg, in the county of Pike and State of Indiana, have invented certain new and useful Improvements in Sulky Attachments for Plows, of which the following is a full, clear, and exact description.

Reference is to be had to the accompanying drawings, forming part of this specification, in which similar letters of reference indicate corresponding parts in all the figures.

Figure 1 is a plan view of one of my sulky attachments, partly in section, and shown as applied to a plow. Fig. 2 is a side elevation of the same. Fig. 3 is a sectional front elevation of the same, taken through the line $x\ x\ x\ x$, Fig. 1.

The object of this invention is to provide sulky attachments for walking-plows of all kinds, and which shall be constructed in such a manner that the said plows can be readily adjusted and controlled as the work to be done may require.

The invention consists in the construction and combination of various parts of the sulky attachment, as will be hereinafter fully described and then claimed.

A represents the beam, B the handle, C the mold-board, D the point, E the landside, and F the standard of an ordinary walking-plow. G is the axle, the land-side part of which is horizontal, and its plowed-land side is bent into arched form with vertical arms, as shown in Fig. 3. To the land-side end of the axle G is pivoted the crank-axle H of the land-wheel I. To the pivoted end of the crank-axle H is rigidly attached the lower end of an upwardly-projecting lever, J, so that by operating the said lever the crank-axle can be turned to raise and lower the land-side end of the axle G to level the attachment as the surface of the land or the depth of the furrow may require. To the axle G, near its land-side end, is rigidly attached a catch-plate, K, the upper edge of which is curved in the arc of a circle, and has recesses formed in it to receive the pawl L to hold the lever J, and with it the crank-axle H, in any position into which they may be adjusted. The pawl L is pivoted to the lower part of the lever J, and is connected by a rod, M, with an elbow-lever, N, pivoted to the upper part of the said lever J, so that the pawl L can be readily raised from the catch-plate K to release the said lever J by operating the elbow-lever N. The upper arm of the elbow-lever N is held out from the lever J, holding the pawl L in gear with the catch-plate K by a spring, O, attached to the said lever J, and resting against the upper arm of the said elbow-lever N, as shown in Fig. 2.

The plowed-land end of the axle G is bent outward into a horizontal position, and is squared to fit into a square hole in the inner end of the crank-axle P, where it is secured in place by a set-screw, Q, so that the said crank-axle P can be readily removed and adjusted to bring the plowed land or furrow wheel R to the front or rear of the axle G to adjust the said wheel out of the way of the furrow-slice turned by the plow as the kind of plow used may require.

To the end parts of the axle G are connected, by clips S or other suitable means, the rear ends of the rods T, the forward ends of which are pivoted to the opposite sides of the forward end of the plow-beam A by a bolt, U, or other suitable means, so that the sulky attachment will be drawn from the forward end of the plow-beam, and the axle G and its attachments, and the rear part of the plow will be free to move up and down independent of each other. Several holes are formed in the forward ends of the rods T to receive the bolt U, so that the said bolt can be adjusted as the length of the plow-beam may require.

To the upper parts of the vertical arms of the arched part of the axle G are rigidly attached two bars, V, the rear ends of which, at a little distance from the said axle G, are connected by a cross-bar, W, attached to or formed solid with the said bars V. The forward parts of the bars V extend forward, are curved downward, and their ends are connected near the level of the top of the plow-beam A by a cross-bar or round, X. To the top of the plow-beam A, a little in front of its standard F, is secured, by bolts or by a clip or strap or other suitable means, the eye-plate Y, to which is hinged a clevis, Z, the ends of the arms of which are pivoted, by bolts or rivets, to the upright arms of the arched part of the axle G. To the upper side of the beam A is attached a lug, $a$, to which is pivoted the slotted lower end of a connecting-bar, $b$. The upper part of the connecting-bar *b* is slotted to receive and is pivoted to the end of the forward arm of the three-armed lever *c*, the end of the lower arm of which is pivoted to the bar *d*, attached to a side bar and the rear end bar of the frame V W X. To the bar *d* is also attached a catch-plate, *e*, the upper edge of which is curved in the arc of a circle, and is recessed to receive the pawl *f*. The pawl *f* is pivoted to the lever *c*, and is connected, by a rod, *g*, with the small elbow-lever *h*, which is pivoted to the upper part of the said lever *c*. The upper arm of the elbow-lever *h* is held away from the lever *c*, holding the pawl *f* in gear with the catch-plate *e* by a spring, *i*, attached to the said lever *c*, and resting against the said upper arm of the elbow-lever *h*. By this construction by operating the lever *c* the plow can be raised from the ground, the forward part of the plow-beam coming in contact with the forward cross-bar of the frame V W X, which causes the plow to rise horizontally.

To the rear part of the outer side bar, V, is secured, by bolts *j*, the forward end of a bar, *k*, the rear part of which is curved downward and rearward, and to its lower end, between the rear parts of the mold-board C and land-side E, is swiveled the standard *l*, to the slotted lower end of which is pivoted the caster-wheel *m*. Several holes are formed in the upper end of the bar *k* to receive the fastening-bolts *j*, so that the said bar can be readily adjusted as the length of the plow-beam may require. With this construction the downward pressure of the plow when running at the desired depth can be supported so that the draft will be much lighter than when the plow is allowed to rest upon the bottom of the furrow. With this construction also when the lever *c* is operated the plow will be raised from the ground and supported by the wheel *m*, and held steadily while being drawn from place to place.

The driver's seat *n* is attached to the upper end of the spring-standard *o*, the lower end of which is attached to the axle G, and is connected with the inner side bar of the frame V W X by a bent bar, *p*. The lower parts of the seat-standard *o* and bar *p* are strengthened by braces *q*. The lower part of the brace-bar *p* serves as a rest for one of the driver's feet, and his other foot rests upon the inwardly-projecting arm of the lever *r*, pivoted to the rear part of the draft-rod T. The outer arm of the lever *r* is provided with a brake-shoe, *s*, to bear against the wheel I, to hold the plow back from the team while moving from place to place.

Having thus described my invention, what I claim as new, and desire to secure by Letters Patent, is—

1. In a sulky attachment for plows, the combination, with the upright arms of the arched axle G and the plow-beam A, of the frame V W X, the hinged clevis Z, the pivoted connecting-bar *b*, the lever *c*, and the catch-plate *e*, and spring-lever pawl *f g h i*, substantially as herein shown and described, whereby the plow can be readily raised and lowered, as set forth.

2. In a sulky attachment for plows, the combination, with the frame V W X, attached to the upright arms of the arched axle G, and connected by the hinged clevis Z, the connecting-bar *b*, and the lever *c* with the plow-beam, of the curved bar *k*, and the caster-wheel *l m*, substantially as herein shown and described, whereby the plow can be supported above the ground and readily drawn from place to place, as set forth.

THEODORE JOHNSON.

Witnesses:
  MADISON H. FRANK,
  EMORY H. HARRELL.